(12) United States Patent
Broyles

(10) Patent No.: US 7,487,999 B1
(45) Date of Patent: Feb. 10, 2009

(54) PERSONALIZED REPETITIVE LANGUAGE KIT AND PROCESS

(75) Inventor: Lucy Broyles, 2212 Stanford Ct., McKinney, TX (US) 75070

(73) Assignee: Lucy Broyles, McKinney, TX (US)

( * ) Notice: Subject to any disclaimer, the term of this patent is extended or adjusted under 35 U.S.C. 154(b) by 652 days.

(21) Appl. No.: 09/747,909

(22) Filed: Dec. 22, 2000

(51) Int. Cl.
*B42D 1/08* (2006.01)
*G09B 17/00* (2006.01)

(52) U.S. Cl. ............................ 281/22; 281/19.2; 402/8; 434/178

(58) Field of Classification Search .................. 281/3.1, 281/5, 12, 15.1, 19.2, 21.1, 22, 27.1, 29, 281/36–38, 51; 402/8, 73, 80 R, 80 P; D19/26, D19/27, 32; 434/317, 156, 178, 236, 238
See application file for complete search history.

(56) References Cited

U.S. PATENT DOCUMENTS

| | | | | |
|---|---|---|---|---|
| 517,803 | A * | 4/1894 | Howard | 34/95 |
| 839,010 | A * | 12/1906 | Lawrence | 40/404 |
| 916,369 | A * | 3/1909 | Richardson | 281/23 |
| 1,275,508 | A * | 8/1918 | Wagner | 281/45 |
| 1,280,790 | A * | 10/1918 | McMann | 281/21.1 |
| 1,908,083 | A * | 5/1933 | Tolchinsky | 281/21.1 |
| 2,359,473 | A * | 10/1944 | Fry | 281/19.1 |
| 2,694,264 | A * | 11/1954 | Seaton | 434/156 |
| 3,605,287 | A | 9/1971 | Jonesi | 35/26 |
| 4,149,738 | A * | 4/1979 | Illos et al. | 283/72 |
| 4,828,289 | A * | 5/1989 | Korner | 281/15.1 |
| 5,190,316 | A | 3/1993 | Hefty | 281/15.1 |
| 5,334,021 | A * | 8/1994 | Kahn | 434/348 |
| 5,387,107 | A * | 2/1995 | Gunter et al. | 434/238 |
| 5,454,678 | A | 10/1995 | Hefty | 412/1 |
| 5,651,678 | A * | 7/1997 | Phillips | 443/170 |
| 5,787,617 | A | 8/1998 | Testa | 40/124.06 |
| 5,816,730 | A | 10/1998 | Alspaw et al. | 402/79 |
| 5,844,797 | A * | 12/1998 | Johnson | 700/90 |
| 5,884,770 | A * | 3/1999 | Galm | 206/575 |
| 5,947,522 | A | 9/1999 | Boehm | 281/22 |

(Continued)

OTHER PUBLICATIONS

Booth, David, "Guiding the Reading Process:Techniques and Strategies for Successful Instruction in K-8 Classrooms", 1998, Pembroke Publishers Ltd., p. 8: "Semantic Clues", p. 11: "Meaning and Experience", and p. 12, paragraph #4.*

*Primary Examiner*—David P Bryant
*Assistant Examiner*—Eric A. Gates
(74) *Attorney, Agent, or Firm*—Conley Rose, P.C.; Kristin Jordan Harkins

(57) ABSTRACT

The present invention relates to a repetitive language kit combined with a series of early reading experiences that facilitate the teaching of reading to pre-readers. The kit is comprised of an assembly of pages that present a photographic site for receiving a personalized photograph and a text site for receiving repetitive and personalized text relating to the photograph as part of a theme. A binder secures the pages between front and back covers and provides movement of the pages through an arc. Cards having repetitive text corresponding to the repetitive text of the pages reinforce and further the reading skills of the pre-reader. The process for creating the book comprises memorializing an experience between a person and pre-reader through photographs, affixing the photographs to the pages of the kit, compiling the pages into a bound book and reading the book to the pre-reader who memorizes and play reads along.

19 Claims, 9 Drawing Sheets

U.S. PATENT DOCUMENTS

| | | | |
|---|---|---|---|
| 5,951,298 A * | 9/1999 | Werzberger | 434/178 |
| 5,957,693 A * | 9/1999 | Panec | 434/178 |
| 5,988,685 A | 11/1999 | Mogelonsky et al. | 281/31 |
| 5,997,207 A | 12/1999 | Robinson | 402/79 |
| 6,142,530 A * | 11/2000 | Emmerich | 283/63.1 |
| 6,210,172 B1 * | 4/2001 | Clements | 434/428 |
| 6,253,475 B1 * | 7/2001 | Ruebens | 40/537 |
| 6,447,013 B1 * | 9/2002 | Francesco | 281/21.1 |
| 6,525,706 B1 * | 2/2003 | Rehkemper et al. | 345/87 |
| 6,632,094 B1 * | 10/2003 | Falcon et al. | 434/178 |
| 2002/0067037 A1 * | 6/2002 | Lo | 281/15.1 |

\* cited by examiner

PERSONALIZED REPETITIVE LANGUAGE KIT AND PROCESS

FIELD OF THE INVENTION

The present invention relates to a kit and a process for creating a personalized repetitive language book which facilitates the teaching of reading comprising an assembly of pages that presents a photographic site for receiving a personalized photograph and a caption site for receiving repetitive and personalized text relating to the photograph as part of a theme which memorializes a pre-reader's personal experience.

BACKGROUND OF THE INVENTION

Before a pre-reader learns how to read, she learns about reading. For example, when a baby hears a story and simultaneously sees pictures which are pointed to by the reader, she is learning about reading. Similarly, an infant follows the words while viewing the pictures in her favorite books and enjoys doing so time and time again. She gains security from hearing the story repeated while learning about reading. Naming the objects in pictures over and over again helps the pre-reader to understand the concept that objects have names and, in turn, that words have meanings. Very early on, pre-readers learn to play-read the actual words before they are able to relate to or read the printed words. Play-reading with the reader is accomplished with the pre-reader memorizing the spoken text in association with viewing the objects in a picture. Repetitive text in picture books facilitates and encourages this memorization. As a reader points to a word and pronounces the word in relation to an object in a picture, the pre-reader begins to develop a correlation between what is said and the printed word. In addition, left to right reading orientation is recognized by the pre-reader. A pre-reader can then be assisted in pointing to each word as the word is spoken. Thereafter, the pre-reader becomes adept at pointing to each word and play reading the word which she has memorized. The pre-reader begins to understand the concept of associating the spoken word with the printed word. Providing a repetition of words on every page of a book allows the pre-reader to practice the sight/sound correlation of words while building the confidence required for the pre-reader to master the skill of reading. The pre-reader learns that she can hear and memorize the same words on every page and then learns that she can see the same words on every page. The association of the spoken word with the printed word is developed.

Traditional reading books at the pre-reader level provide repetitive language and related pictures to facilitate the process of learning to read. However, the pictures and associated text are impersonal. The pre-reader seldom has an experience, reference or connection to the text or pictures of the traditional book to which she can personally relate. The memorization process is thus slow for the pre-reader who must hear the words read over and over again in relation to the pictures before she can begin to remember the text and associate the text with the pictures.

While personal photographic books provide a personal reference or connection to the pre-reader, traditional photo albums do not provide the repetitive language required for teaching a pre-reader about reading and how to read. The photographs may be personal to the pre-reader but without repetitive language, the books are merely a picture book with no means to facilitate the learning process of reading to a pre-reader.

SUMMARY OF THE INVENTION

Through significant time and effort, it has been found that memorializing the personal experiences of a pre-reader and coupling that memory with easy repetitive language suitable for a pre-reader teaches printed word concepts to the pre-reader and re-enforces reading skills, especially when the text has a personally enjoyable meaning. In particular, it has been found that memorializing a shared experience between a reader and a pre-reader through visual representations provides invaluable assistance in teaching the pre-reader about reading and how to read. The personalized visual representations can be affixed onto pages having a theme which relates to the shared experience of the reader and pre-reader. Text on the pages is repetitive and additional personalized text can be added to create a caption that relates to the photographs. The pages can be compiled according to the preferences of the reader and pre-reader to create a personalized repetitive language book for reading to the pre-reader. Duplicates of the personalized book can be created so that the reader can read his copy while the pre-reader play-reads along with her copy, even when the reader and pre-reader are physically separated. Play-reading the personalized book becomes automatic as the pre-reader's memorization of the text is sharpened by her personal experience captured in the photographs. Soon the written words can be carried over from the text in the personalized book to words printed on cards which provides the pre-reader with further practice in advanced reading skills of finding, comparing and putting words in spoken order and phrases into complete sentences.

In accordance with the present invention, there is provided a repetitive language kit for facilitating the process of teaching a pre-reader how to read. The kit of the present invention includes an assembly of pages, front and back covers, and front and back protector sheets, each having binder and outer edges. The pages comprise a photographic site for receiving a personalized photograph and a corresponding caption site having repetitive text at a level suitable for teaching a pre-reader. The caption site is also configured to receive personalized text. The repetitive and personalized text of the caption site relate to the corresponding personalized photograph to provide a theme or story throughout the book. The front cover comprises a title caption which corresponds to the theme and personalization of the book created by the personalized photograph and the repetitive and personalized text contained on the pages. The front cover is also configured to receive personalized text for indicating to and from whom the book is given. The back cover is configured for receiving text which identifies other available theme kits. The protector sheets are preferably plastic flexible sheets which protect the covers and pages and can be easily cleaned by wiping with a damp cloth.

The repetitive language kit of the present invention further comprises a binder for securing the pages between the covers and protector sheets along their binder edges. While a variety of binders are suitable for securing the book together, preferably the binder is a flexible material. The binder edges of the pages, covers and sheets preferably comprise one or more perforations for alignment together. The book is complied by aligning the binder edges of the pages which are placed in order of personal preference between the front and back covers and between the front and back protector sheets. The flexible binder is threaded through the aligned perforations from the back protector sheet and cover through the assembled pages and then the front cover and protector sheet to form loops proximate the perforations of the front protector sheet. The ends of the flexible binder wrap around the outer edges of the pages, covers and sheets proximate the binder edges, are threaded through the loops and are secured together.

The repetitive language kit of the present invention further comprises an assembly of cards having printed thereon the repetitive language contained in the book. The cards are provided to reinforce and further the reading skills of the pre-reader. A case suitable for housing and protecting the pages, covers, protective sheets, binder and cards is also provided in the repetitive language kit of the present invention. The case is generally the shape of the assembled book and has handles proximate the upper portion thereof for ease of carrying the kit of the present invention.

The present invention further comprises a method of teaching a pre-reader to read. The process comprises obtaining a repetitive language kit of the present invention having a theme relating to a desired outing or experience between the reader and pre-reader. For example, an appropriate theme would be "I See Animals" for a visit to the zoo. During the outing, photographs are taken of the animals, birds and other experiences of the reader and pre-reader. The photographs are affixed in the pages of the book proximate the photographic site. Text which relates to the photographs and which are appropriate for the pre-reader level is contained in the caption site corresponding to the photographs. Additional personal text such as the reader's or pre-reader's name is added to the caption site to further personalize the book. The book is compiled by placing the pages in order of personal preference and inserting the pages between the covers and protective sheets along their binder edges. The binder is threaded through the perforations of the aligned binder edges from the back protective sheet and cover through the pages and front cover and protector sheet perforations to form loops proximate the perforations of the front protector sheet. The flexible binder is wrapped around the outer edges of the protective sheets, covers and pages proximate their binder edges, and the ends of the binder are threaded through the loops and secured together. The book is repeatedly read to the pre-reader who memorizes and play-reads along, as the pre-reader personally relates to the photographs and the text. The cards containing the repetitive and personalized text contained in the caption site of the pages are used to further reinforce the reading skills of the pre-reader who has begun to associate the spoken words with the corresponding printed words.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

Figure 1A:
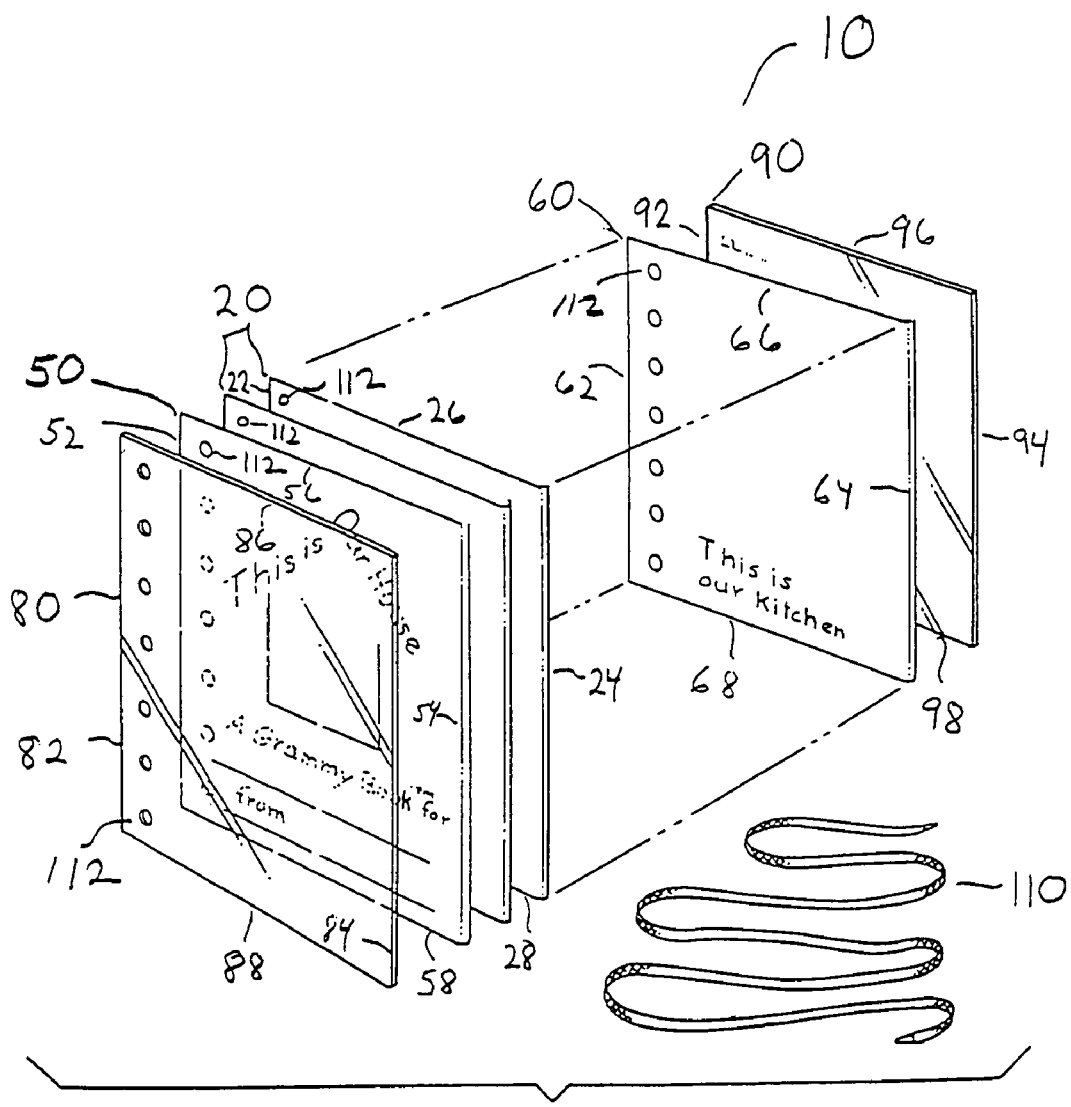
FIG. 1A provides a perspective view of a repetitive language kit of the present invention.
Figure 1B:
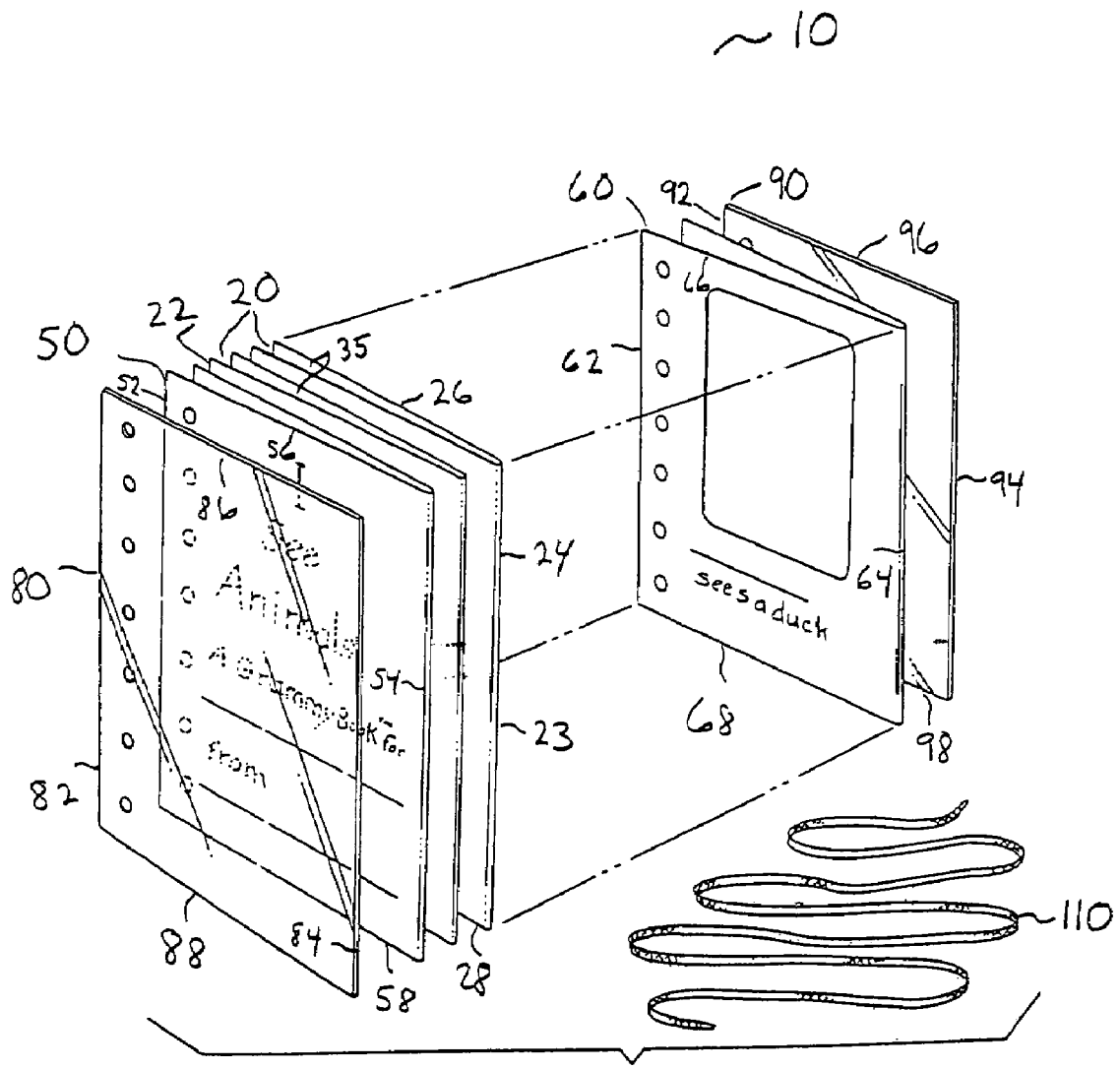
FIG. 1B provides a perspective view of another embodiment of a repetitive language kit of the present invention.

REFERRING TO FIGS. 1A and 1B, embodiments of a repetitive language kit 10 as contemplated by the present invention are generally shown. The kit 10 includes at least one page 20, front cover 50 and back cover 60. Front protective sheet 80 and back protective sheet 90 are also provided in kit 10. The kit 10 further comprises a binder 110 for securing pages 20, covers 50, 60 and protective sheets 80, 90 together. A plurality of cards 130 and a container 150 for housing the components of the kit 10 are included in the kits, illustrated in FIG. 6. Page 20 generally comprises binder edge 22 and outer edges 24, 26, 28. Front and back covers 50, 60 include also binder edges 52, 62 and outer edges 54, 56, 58 and 64, 66, 68, respectively. Similarly, front and back protective sheets 80, 90 comprise binder edges 82, 92 and outer edges 84, 86, 88 and 94, 96, 98, respectively. The protective sheets 80, 90 are preferably constructed of plastic flexible sheets to protect the book covers 50, 60 from dirt, liquids and general wear and which can be easily cleaned by wiping with a damp cloth. In another embodiment, protective sheets 80, 90 are transparent so that the text on the book covers 50, 60 can be seen when protective sheets 80, 90 are positioned over book covers 50, 60.

Figure 2A:
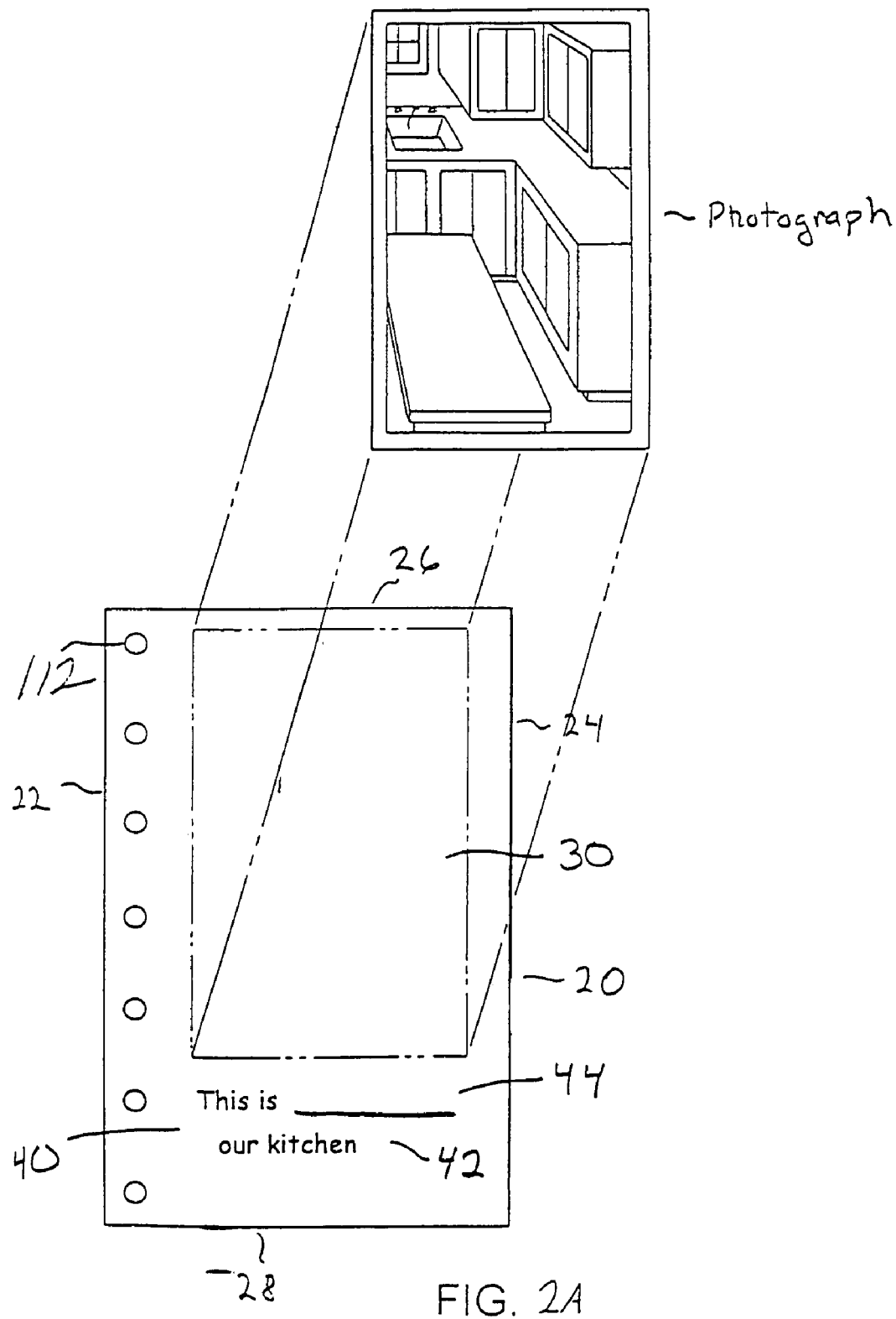
FIG. 2A provides a plan view of a page of a repetitive language kit of the present invention having an exploded section thereof.

REFERRING TO FIG. 2A, an embodiment of an exemplary page 20 is illustrated. In addition to binder edge 22 and outer edges 24, 26, 28 page 20 further comprises a photographic site 30 configured to receive a photograph (shown) and a corresponding caption site 40 configured to receive repetitive text 42 and/or personalized text 44. While photographic site 30 and corresponding caption site 40 are shown in a top to bottom relationship proximate page 20, sites 30, 40 can alternatively be in a side to side relationship on page 20, or proximate opposite corners of page 20. In one embodiment, photographic site 30 and corresponding caption site 40 are proximate the same page 20. In an alternative embodiment, photographic site 30 and caption site 40 are proximate opposing pages (not shown) when the kit is assembled into a book and open to the opposing pages. Photographic site 30 is configured to receive a photograph proximate the surface of page 20. The photograph can be affixed to page 20 proximate photographic site 30 by liquid adhesive, glue, tape or other types of adhesive suitable for affixing a photograph to a surface of page 20. Caption site 40 is configured to received text 42 which corresponds to the photograph. For example, as illustrated in FIG. 2A, a personalized photograph depicting a kitchen is affixed proximate the photographic site 30 and the text "this is our kitchen" contained in the caption site 40 corresponds to the photograph. The repetitive text 42 "sees a bird" or "sees a duck" corresponds with a photograph depicting a bird or duck (not shown), respectively.

Figure 2B:
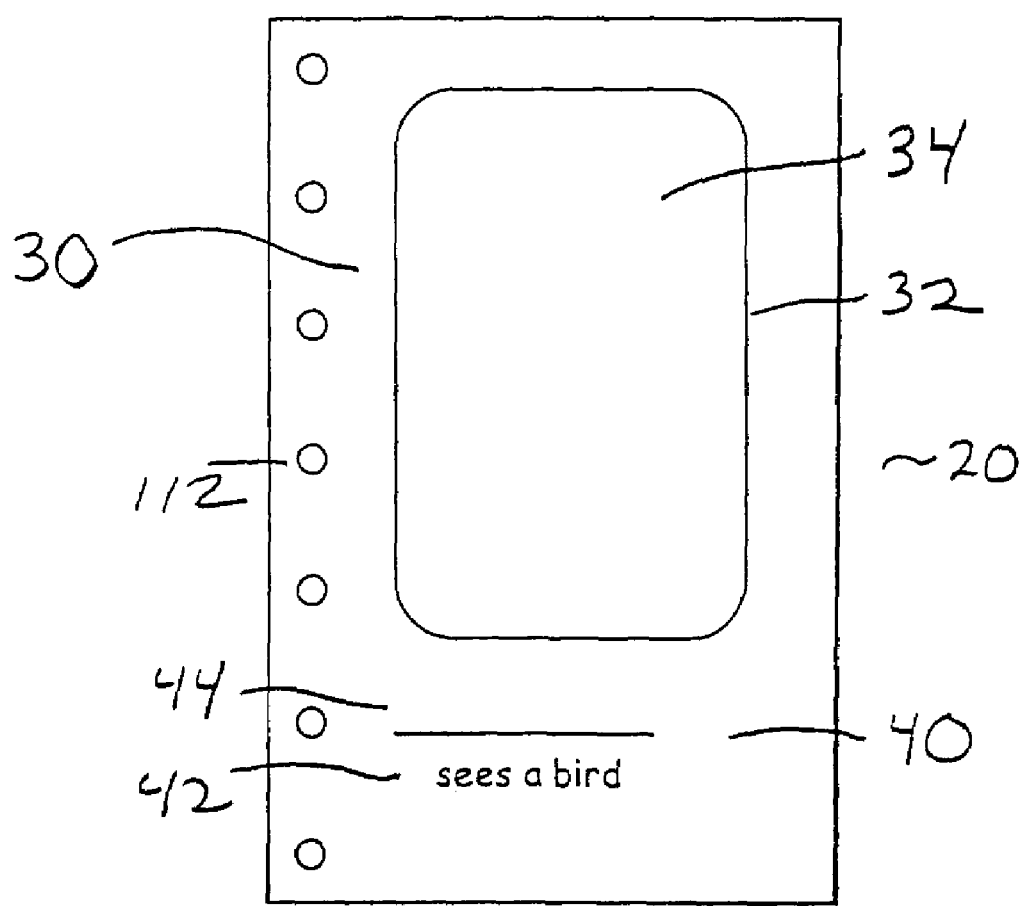
FIG. 2B provides a plan view of another embodiment of a page of a repetitive language kit of the present invention.

REFERRING TO FIG. 2B, an alternative embodiment of page 20 of the present invention is illustrated. A border 32 is delineated by a cut away portion 34 of photographic site 30. Cut away portion 34 is generally the size and shape of a photograph to be affixed proximate the photographic site 30. While the cut away portion 34 is illustrated in portrait, alternatively the cut away portion 34 could be in landscape. A photograph (not shown) is received proximate the back surface of page 20 for viewing through the border 32 of photographic site 30. Border 32 thus creates a frame around the photograph. Repetitive text 42 is proximate caption site 40 and corresponds to the photograph framed by border 32. In this configuration, the back of the photograph would be seen when viewing the back surface of page 20.

Figure 2C:
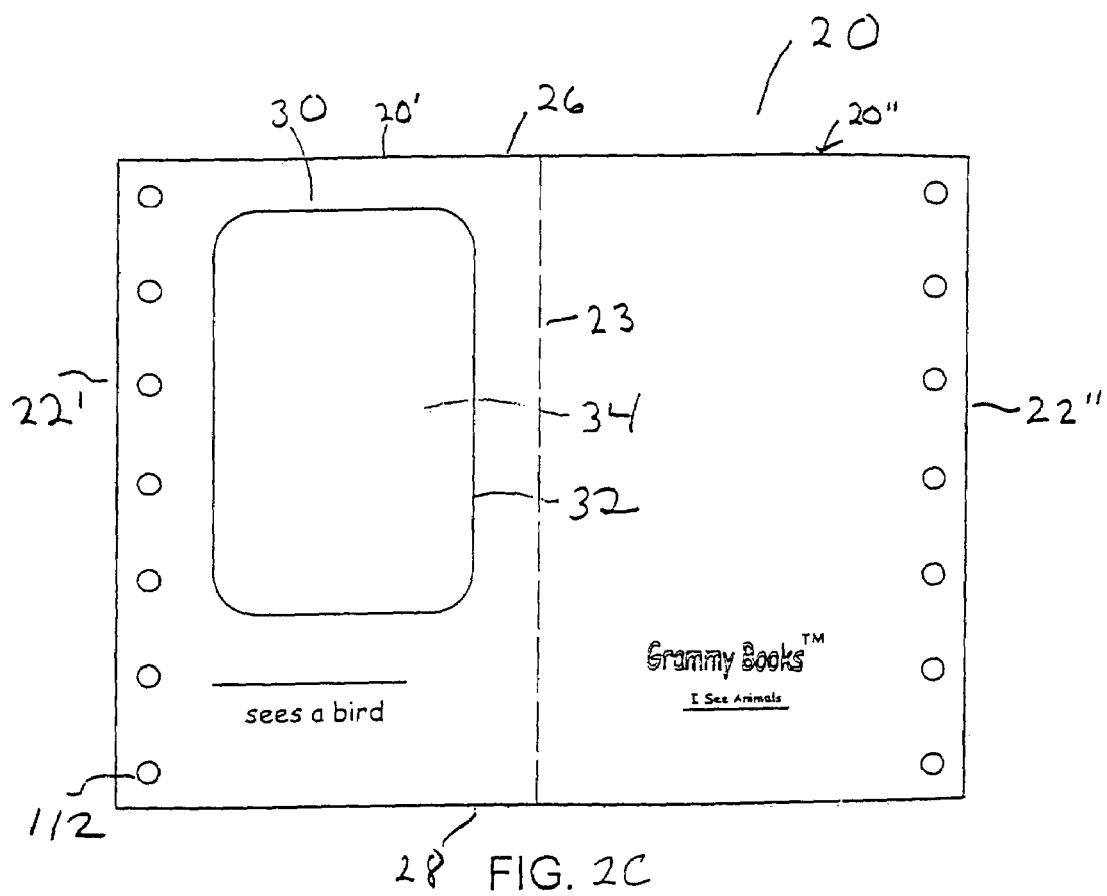
FIG. 2C provides a plan view of yet another embodiment of a page of a repetitive language kit of the present invention.

REFERRING TO FIG. 2C, in an alternative embodiment, page 20 comprises outer edges 26, 28 and substantially parallel edges 22', 22" having a fold line 23 therebetween. Edges 22', 22" are aligned and page 20 is folded along fold line 23. In the folded configuration, aligned edges 22', 22" create binder edge 22 and fold line 23 creates outer edge 24 of page 20, as illustrated in FIG. 1B. Receptacle 35 also illustrated in FIG. 1B is created between front and back page surfaces 20', 20" and is enclosed along fold line 23 and along binder edge 22 when the book is assembled. Photographic site 30 could receive a photograph proximate the surface of page 20. Alternatively, photographic site 30 could comprise cut away portion 34 for delineating border 32. A photograph is received in receptacle 35 between front and back page surfaces 20', 20". This embodiment advantageously conceals the back of the photograph. Further advantages of this configuration include a sturdier and more durable page 20 comprised of front and back surfaces 20', 20". Binder edge 22 is reinforced as well with of dual edges 22', 22".

Figure 3:
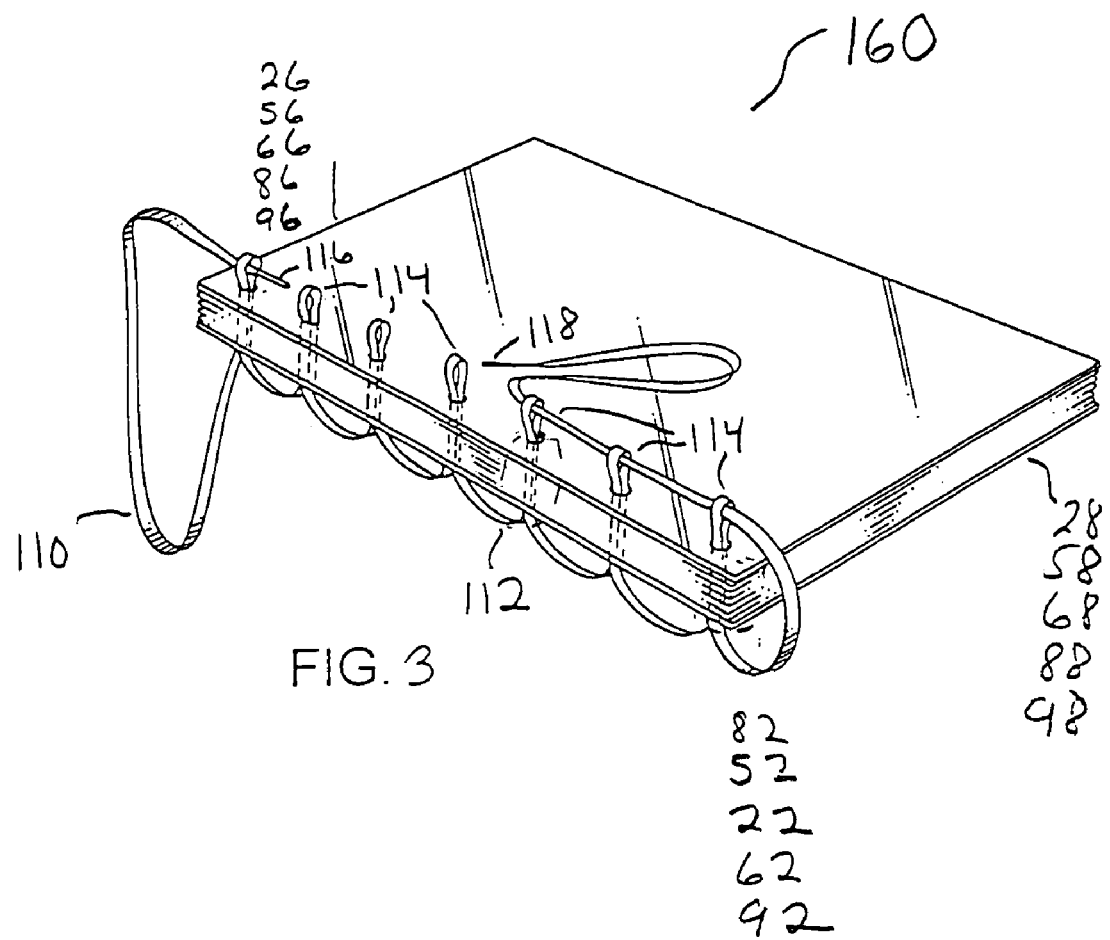
FIG. 3 provides a perspective view of a binder for the language book of the present invention.

REFERRING TO FIGS. 1A, 1B, and 3, binder edges 22, 52, 62, 82, 92 of page 20, front and back covers 50, 60 and front and back protective sheets 80, 90, respectively, are generally aligned and affixed together to form book 160 of the present invention. In one embodiment, each of binder edges 22, 52, 62, 82, 92 comprises at least one perforation 112 for receiving binder material 110. In an alternative embodiment, multiple perforations 112 along each of binder edges 22, 52, 62, 82, 92 are preferably spaced substantially equally along the length of and from binder edge 22, 52, 62, 82, 92. While perforations 112 are illustrated for receiving binder 110 along binder edge 22, 52, 62, 82, 92, any of a number of other configurations for the binder edges is suitable for receiving binder 110. While binder 110 is illustrated as a flexible material, and more particularly, as lace, ribbon, string or yarn, alternative binder materials are suitable. For example, adhesives such as glue or tape are suitable for securing page 20, covers 50, 60 and protective sheets 80, 90 together along binder edges 22, 52, 62, 82, 92, respectively. Additionally, fasteners such as staples or clips are appropriate binder materials. Book 160 is assembled by organizing pages 20 in order of preference between front and back covers 50, 60 and front and back protective sheets 80, 90. Binder edges 22, 52, 62, 82, 92 are aligned along perforations 112. Flexible binder 110 is threaded through the aligned perforations 112 from back protector sheet 90 and back cover 60, through assembled pages 20 and through front cover 50 and front protector sheet 80 to form loops 114 proximate perforations 112 of front protector sheet 80. Flexible binder 110 is wrapped around outer edges 26, 28 of pages 20, outer edges 56, 58 and 66, 68 of covers 50, 60, respectively, and outer edges 86, 88 and 96, 98 of protective sheets 80, 90, respectively, proximate binder edges 22, 52, 62, 82, 92. Ends 116, 118 of flexible binder 110 are threaded through loops 114 proximate front protective sheet 80 and secured together.

Figure 4:
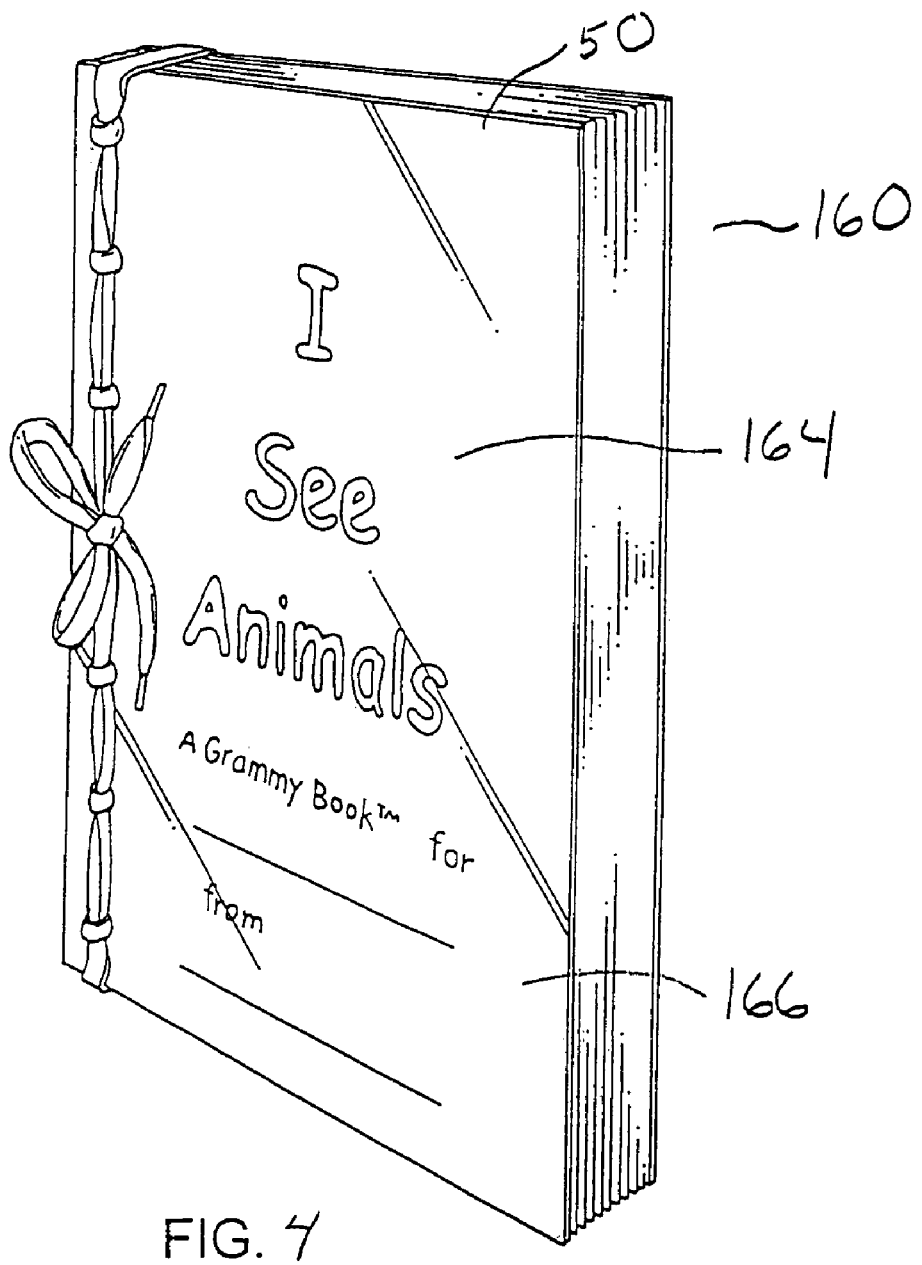
FIG. 4 provides a plan view of the front of a repetitive language book of the present invention.
Figure 5:
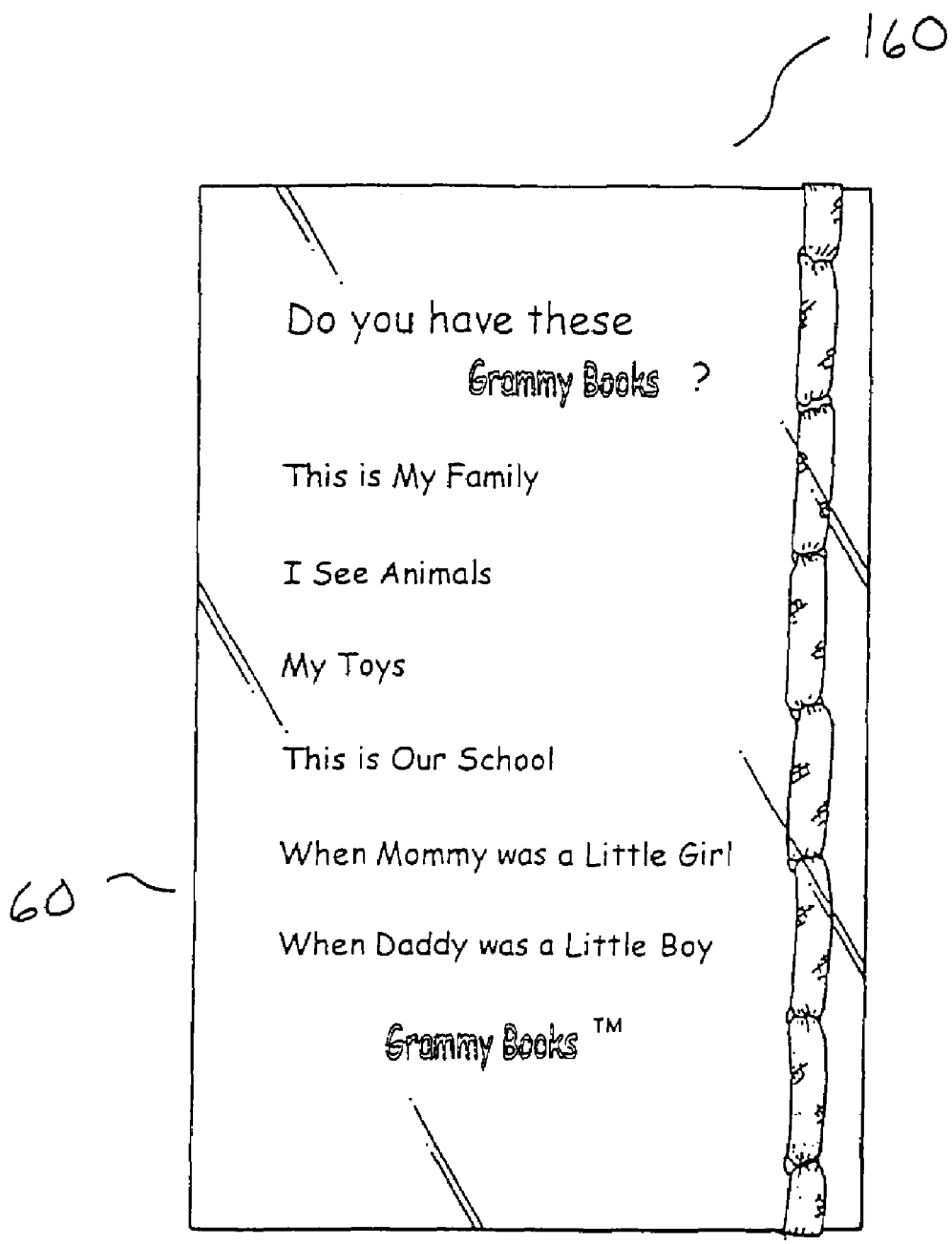
FIG. 5 illustrates a plan view of the back of a repetitive language book of the present invention.

REFERRING TO FIGS. 4 and 5, the assembled book 160 of the present invention is illustrated. Front cover 50 is configured to receive a title 164 which corresponds with the text of the caption site 40 proximate pages 20. The title 164 and repetitive text 42 of caption site 40 create a theme for each book 160 which is memorialized in the photographs received in photographic site 30 of page 20. Front cover 50 is also configured to receive personalized text 166, for example, the names of persons who are giving and receiving the book. Appropriate themes for book 160 relate to outings suitable for a pre-reader such as a visit to a zoo or a tour through a school. Accordingly, title 164 may include the text "I See Animals" for a book relating to a zoo outing or "This Is My School" for a book compiling a pictorial representation of a school tour. Alternatively, suitable themes include a collection of family photographs, a pre-reader's toys or the home of a pre-reader. Further appropriate titles 164 would include "This Is My Family," "When Mommy Was a Little Girl," "When Daddy Was A Little Boy," "My Toys" and "This is Our House." Back cover 60 is configured for receiving a list of other available theme kits of the present invention. The list comprises titles 164 contained on front covers 50 of available theme kits.

Figure 6:
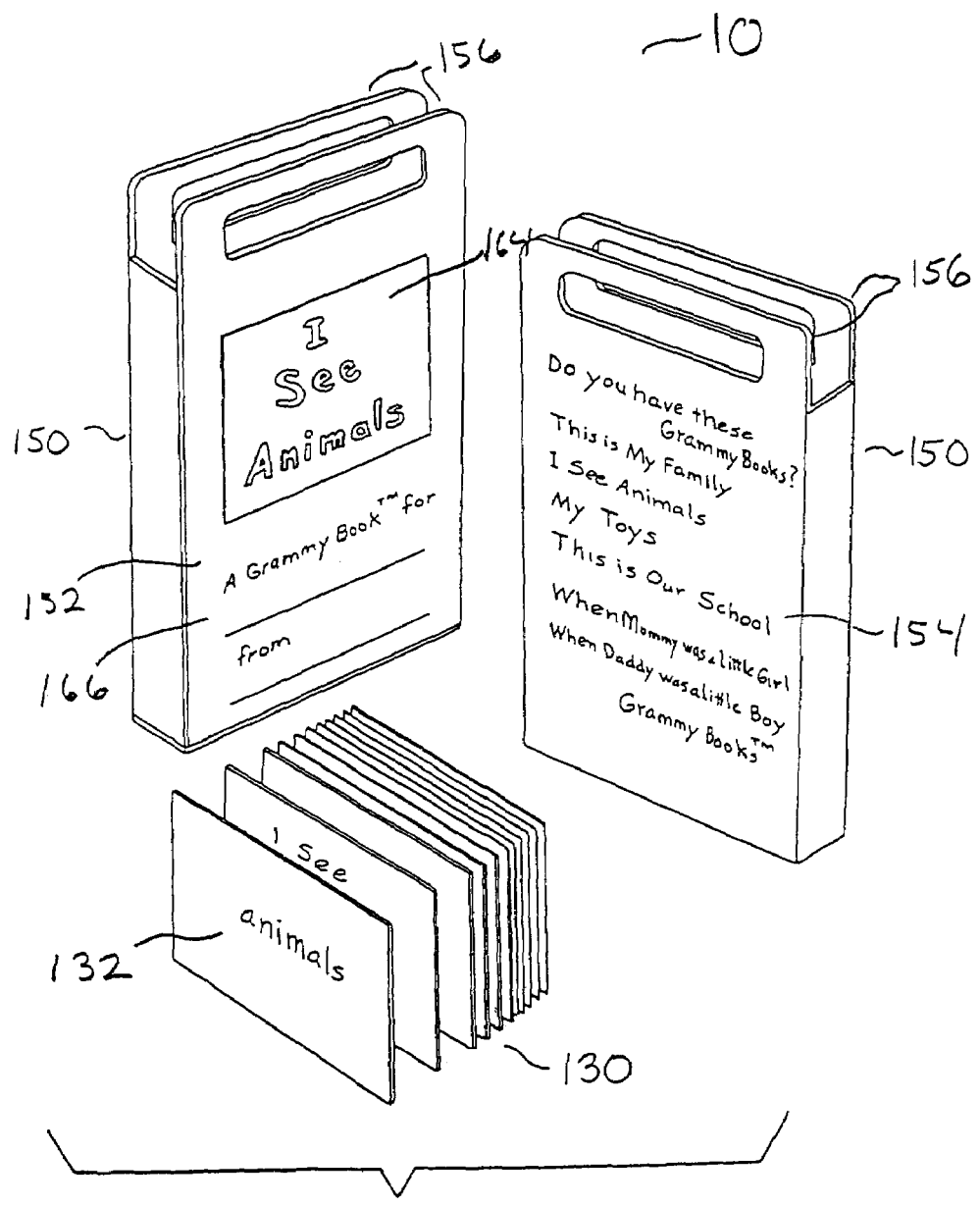
FIG. 6 illustrates a carrying case and cards for a repetitive language kit of the present invention.

REFERRING TO FIG. 6, the repetitive language kit 10 of the present invention further comprises an assembly of cards 130 configured to receive text 132 which corresponds to repetitive text 42 of the pages 20. The text 132 on cards 130 reinforce and further the reading skills of the pre-reader by repeating the text of pages 20. Case 150 suitable for housing the disassembled pages 20, covers 50, 60, protective sheets 80, 90, binder 110 and cards 130 is also provided in the repetitive language kit 10 of the present invention. The case 150 is generally the shape and size of the assembled book 160 and is suitable for protecting and carrying the book. Case 150 is preferably constructed of sturdy paper such as cardboard or the like, although any material suitable for a case is appropriate. Case 150 comprises a front side 152 configured to receive the title 164 and personalized text 166 corresponding to front cover 50 of book 160. Case 150 further comprises a back side 154 configured to receive a list of titles 164 corresponding to the list of titles 164 contained on back cover 60 of book 160. The front and back sides 152, 154 of case 150 are comprised of handles 156 proximate their upper edges for carrying case 150 and the contents therein.

The present invention further comprises a method of teaching a pre-reader to read. The process comprises memorializing objects, persons or experiences familiar to the pre-reader through photographs, pictures, drawings or other visual apparatus. An outing or other experience between the pre-reader and reader could provide the appropriate backdrop for creating and memorializing a familiar experience through photographs or other visual apparatus. For example, a visit to the zoo or a tour of the pre-reader's school are appropriate outings which could be memorialized in photographs. Alternatively, the reader could take pictures of the pre-reader's home, toys or family members either in the presence or absence of the pre-reader. Old pictures of relatives and other persons or objects familiar to the pre-reader could also be used in the process of the present invention. The visual representations of the personal experience or persons or objects familiar to the pre-reader are affixed to pages having a site for receiving a visual representation or photographic. Text which relates to the photographs and which are appropriate for the pre-reader level is added to a caption site corresponding to the photographs. The text should comprise repetitive or personalized text appropriate for the pre-reader level and should create a theme relating to the personal experience of the pre-reader. For example, an appropriate theme for a visit to the zoo is "I See Animals." Each photograph should depict a bird or animal which the pre-reader saw at the zoo and an appropriate repetitive text is "sees a" followed with the name of the bird or animal memorialized in the picture. Additionally, personalized text, for example, the name of the pre-reader, could be placed proximate the repetitive text so that the caption under a picture of a bird would read "(name of pre-reader) sees a bird" to further personalized the pages of the book. Another appropriate theme for a tour of the pre-reader's home is "This Is My House." In this example, the photographs would depict various rooms in the house and an appropriate repetitive text is "this is" followed with the name of the room, for example, "our kitchen" or "(name of pre-reader)'s bedroom". Any number of outings or experiences would be appropriate for creating a book of the present invention having a theme for teaching a pre-reader to read. The book is compiled by organizing the pages in order of personal preference, inserting the pages between the covers and protective sheets and binding the pages, covers and protective sheets together along their binder edges. Compilation of the book can be either a shared experience between the reader and pre-reader or completed by the reader. Once compiled, the book is repeatedly read to the pre-reader who memorizes and play-reads along, as the pre-reader personally relates to the photographs and the text. Duplicates of the book can be assembled so that the reader and pre-reader can each have their own copy to read separately or, alternatively, to read together even when the reader and pre-reader are physically separated.

Cards having the repetitive text contained on the pages of the book can also be used in the process of the present invention for teaching a pre-reader to read. The text on the cards is shown to the pre-reader who has begun to recognize the written words of the repetitive text contained in the book and who can begin to identify the written words with the spoken words.

While preferred embodiments have been shown and described herein, various modifications and substitutions may be made thereto without departing from the spirit and scope of the present inventions. The present invention can be readily adapted to other visual representations, personal experiences, repetitive text and themes and other various apparatus and processes not mentioned herein. Those skilled in the art, however, will readily see other embodiments within the scope of the invention. Accordingly, it is to be understood that the apparatus and method of the present invention for teaching a pre-reader to read has been described by way of illustration and not by way of limitation.

I claim:

1. A process by which a reader facilitates the reading skills of a pre-reader comprising:

the reader obtaining a repetitive language kit having a theme related to a planned shared experience between the reader and the pre-reader, the repetitive language kit comprising:

a plurality of pages having binder and outer edges, the plurality of pages including pages having repetitive text related to the theme of the planned shared experience between the reader and the pre-reader; and a binder configured to secure the plurality of pages, including the pages having repetitive text related to the theme of the planned shared experience between the reader and the pre-reader, proximate the binder edges;

at least one of the pages having repetitive text related to the theme of the planned shared experience between the reader and the pre-reader comprising:

a photographic site configured to receive a pictorial representation; and a caption site corresponding to the photographic site, the caption site configured to receive text which is repetitive;

the reader sharing an actual experience with the pre-reader, the actual shared experience corresponding to the planned shared experience;

memorializing the actual shared experience between the reader and the pre-reader through one or more pictorial representations, the actual shared experience being related to the theme of the repetitive language kit and the repetitive text on the pages having repetitive text;

constructing a first personalized repetitive language book by:

affixing one or more pictorial representations to corresponding ones of the photographic site of the at least one of the pages having repetitive text related to the theme;

personalizing one or more of the one or more pictorial representations by adding text to the caption sites to which the one or more pictorial representations to be personalized were affixed;

organizing the plurality of pages in a preferred order; and binding the plurality of pages with the binder; and the reader reading the plurality of pages to the pre-reader.

2. The process by which a reader facilitates the reading skills of a pre-reader of claim 1 wherein the binder is selected from the group consisting of lace, ribbon, string and yarn.

3. The process by which a reader facilitates the reading skills of a pre-reader of claim 2 wherein said plurality of pages further comprise front and back covers for securing the plurality of pages therebetween and said covers and said plurality of pages having at least one perforation proximate said binder edges for receiving said binder, said binder is threaded through said perforations of said back cover, plurality of pages and front cover to form a plurality of loops proximate said front cover perforations, the ends of said binder are threaded through said loops for securing together.

4. The process by which a reader facilitates the reading skills of a pre-reader of claim 1 wherein said repetitive text on the pages having repetitive text is selected to facilitate teaching of reading to the pre-reader.

5. The process by which a reader facilitates the reading skills of a pre-reader of claim 4 and further comprising the pre-reader memorizing the repetitive text on the pages having repetitive text.

6. The process by which a reader facilitates the reading skills of a pre-reader of claim 5 wherein memorizing, by the pre-reader, of the repetitive text on the pages having repetitive text is enhanced by the repetitive text being related to the actual shared experience between the reader and the pre-reader.

7. The process by which a reader facilitates the reading skills of a pre-reader of claim 1 wherein said text added to the caption sites is personalized repetitive text selected to facilitate teaching of reading to the pre-reader.

8. The process by which a reader facilitates the reading skills of a pre-reader of claim 1, and further comprising constructing a second personalized repetitive language book, the second personalized repetitive language book being generally identical to the first personalized repetitive language book.

9. The process by which a reader facilitates the reading skills of a pre-reader of claim 8, and further comprising the reader reading the first personalized repetitive language book while the pre-reader play-reads the second personalized repetitive text.

10. The process by which a reader facilitates the reading skills of a pre-reader of claim 1, wherein the planned shared experience is a planned trip to a zoo, the actual shared experience is an actual trip to an actual zoo and the pictorial representations are pictures of animals seen at the actual zoo by the reader and the pre-reader.

11. A process by which a reader facilitates the reading skills of a pre-reader comprising:
   obtaining a repetitive language kit having a theme related to a planned shared experience between the reader and the pre-reader, the repetitive language kit comprising:
      a plurality of pages having repetitive text related to the theme of the planned shared experience; and
      a binder configured to secure the plurality of pages having repetitive text related to the theme of the planned shared experience;
   memorializing an actual shared experience between the reader and the pre-reader, the actual shared experience corresponding to the planned shared experience;
   constructing a first personalized repetitive language book by:
      affixing visual memorials of the actual shared experience to the plurality of pages having repetitive text related to the theme of the planned shared experience;
      organizing the plurality of pages in a preferred order; and
      binding the plurality of pages with the binder; and
   reading the plurality of pages of said personalized repetitive language book to the pre-reader.

12. The process by which a reader facilitates the reading skills of a pre-reader of claim 11 and further comprising personalizing said visual memorials by adding personalized text to said plurality of pages to which said visual memorials were affixed.

13. The process by which a reader facilitates the reading skills of a pre-reader of claim 11 and further comprising personalizing said visual memorials by adding personalized repetitive text to said plurality of pages to which said visual memorials were affixed.

14. The process by which a reader facilitates the reading skills of a pre-reader of claim 13, and further comprising constructing a second personalized repetitive language book, the second personalized repetitive language book being generally identical to the first personalized repetitive language book.

15. The process by which a reader facilitates the reading skills of a pre-reader of claim 14, and further comprising the reader reading the first personalized repetitive language book while the pre-reader play-reads the second personalized repetitive language book.

16. The process by which a reader facilitates the reading skills of a pre-reader of claim 15 and further comprising the pre-reader memorizing the repetitive text on the plurality of pages.

17. The process by which a reader facilitates the reading skills of a pre-reader of claim 16 wherein memorizing, by the pre-reader, of the repetitive text on the plurality of pages having repetitive text is enhanced by the repetitive text being related to the actual shared experience between the reader and the pre-reader.

18. The process by which a reader facilitates the reading skills of a pre-reader of claim 11, wherein the planned shared experience is a planned trip to a zoo, the actual shared experience is an actual trip to an actual zoo and the visual memorials are pictures of animals seen at the actual zoo.

19. A process by which a reader facilitates the reading skills of a pre-reader comprising:
   obtaining a repetitive language kit having a theme related to a planned shared experience between the reader and the pre-reader, the repetitive language kit comprising:
      a plurality of pages having repetitive text related to the theme of the planned shared experience between the reader and the pre-reader; and
      a binder configured to secure together the plurality of pages;
   the reader sharing an actual experience with the pre-reader, the actual shared experience corresponding to the planned shared experience;
   memorializing the actual shared experience between the reader and the pre-reader through one or more pictorial representations;
   constructing a first personalized repetitive language book by:
      affixing one or more of said pictorial representations memorializing the actual shared experience to one or more of the plurality of pages having repetitive text; and
      binding the selected ones of the plurality of pages together with the binder; and
   the reader reading the bound plurality of pages to the pre-reader.

* * * * *